June 18, 1940.   G. C. HARBISON   2,205,259
FASTENING MEANS
Filed Dec. 21, 1938
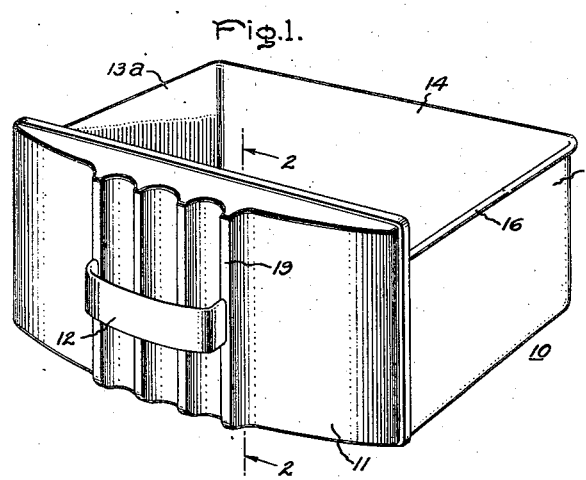
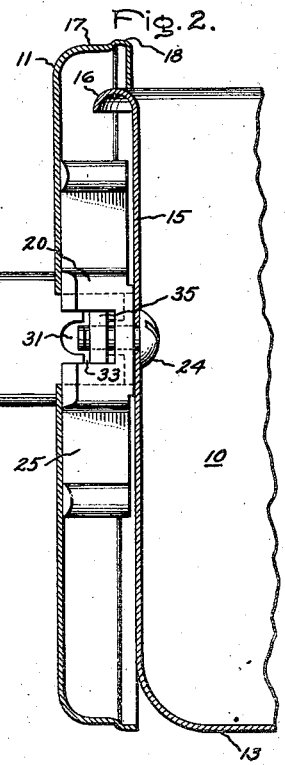
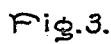
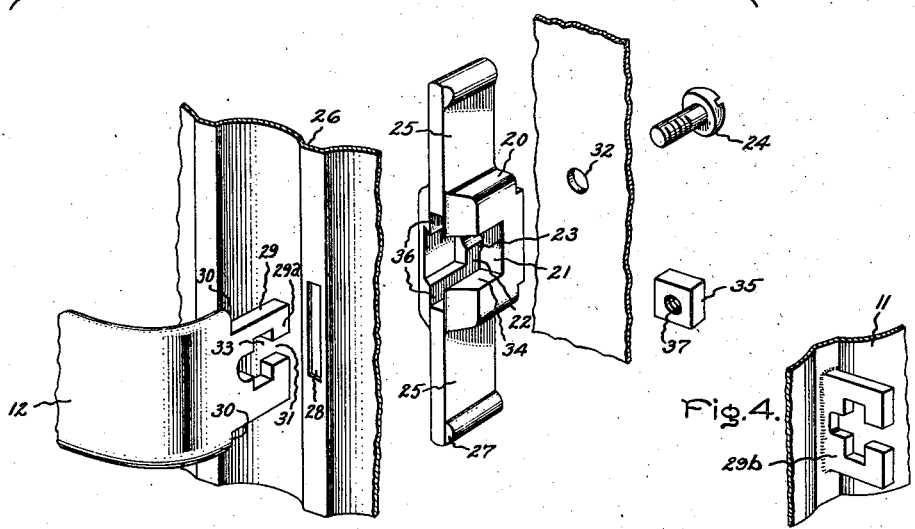
Inventor:
George C. Harbison,
by Harry E. Dunham
His Attorney.

Patented June 18, 1940

2,205,259

UNITED STATES PATENT OFFICE 2,205,259

FASTENING MEANS

George C. Harbison, Erie, Pa., assignor to General Electric Company, a corporation of New York Application December 21, 1938, Serial No. 247,069

6 Claims. (Cl. 45—7)

My invention relates to fastening means, and more particularly to means for fastening a member to a supporting structure.

It is an object of my invention to provide new and improved means for securing a handle structure to a supporting structure.

It is another object of my invention to provide new and improved means for securing a facing plate or false front to a supporting structure.

It is also an object of my invention to provide a new and improved arrangement for securing a handle structure and facing plate to a receptacle in which the fastening arrangement is not visible from the outside of the receptacle and which is simple and permits ready assembly thereof.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a view in perspective of a receptacle arranged accordang to my invention; Fig. 2 is a view, partly in section, of a portion of the receptacle shown in Fig. 1, the view being along the line 2—2 of Fig. 1; Fig. 3 is an exploded view of the various parts of the receptacle shown in Fig. 1; and Fig. 4 is a partial view of a modification of my invention.

Referring to the drawing, there is shown a receptacle 10 having a false front or facing plate 11 maintained in spaced relationship therewith by a spacer 20. A handle 12 is arranged for insertion through an aperture 28 in the facing plate 11 into a recess 21 in spacer 20. The end portion member 29 of handle 12 is slotted as indicated at 31 and 33 to receive suitable fastening means as a bolt 24 and locking nut 35, respectively, for fastening the parts in assembled relationship. Bolt 24, as illustrated, is inserted through opening 32 in the front wall of receptacle 10 and opening 23 in spacer 20 into recess 21 for engagement with nut 35.

The receptacle 10 has a bottom wall 13, side walls 13a, a rear wall 14 and a front wall 15 defining an open top portion. The upper edges of the walls 13a, 14 and 15 of the receptacle 10 are provided with an outwardly directed lip 16 in any suitable manner as by rolling, for example. While the receptacle 10 shown in the drawing is of a type which is particularly adapted for use as a food storage receptacle in connection with domestic refrigerators, I wish it to be understood that my invention is applicable to any holder, container or other supporting structure to which it is desired to affix a handle structure or other member without having the fastening means therefor visible. For example, drawers and shelves are herein considered to be receptacles.

I have provided a false front 11 having inwardly turned flanges 17 and inwardly directed raised flanges 18 extending around the perimeter of the front 11. The edges of the front 11 are rounded and, as illustrated in Fig. 1, the front has been provided with four vertical flutes 19. These last-mentioned features are employed only to improve the appearance of the assembled receptacle and any desired design may be substituted.

In order to maintain the front wall 15 of the receptacle 10 and the facing plate 11 in a predetermined spaced relationship, I have provided a spacer 20 which may be formed in any desired manner from any suitable material. I have found that a spacer molded from a material of a phenolic resin type is suitable for this purpose. As best shown in Fig. 3, the central portion of the spacer 20 is provided with a recess 21 extending inwardly from the front face of the spacer 20. The recess 21 is roughly cubical in shape, two sides being open, that is, the front side and one of the sides extending between the front 11 and the front wall 15 of the receptacle 10. An elongated slot or opening 22 extends longitudinally between the recess 21 and the side of spacer 20 which is adjacent the front wall 15 of the receptacle 10. The longitudinal opening or passage 22 is widened as indicated at 23 to accommodate suitable fastening means, as a screw 24. In order to reinforce the facing plate 11, I have provided the spacer 20 with oppositely extending arms 25. As illustrated in the drawing, the arms 25 are arranged to fit within the depressions 26 caused by the flutes 19 and are provided with inclined projections 27 to engage the sides of the depressions 26. Obviously, the spacer 20 may contact the back side of front 11 instead of fitting into depressions 26.

The front 11 is provided with an aperture 28 aligned with recess 21 and portion 23 of the opening 22 for the reception of a portion 29 of the handle 12. The handle 12 illustrated in the drawing is provided with two leg portions 29 so that two apertures 28 are provided as well as two sets of fastening means. Obviously, the number of apertures is a matter of choice, the choice being dependent, at least in part, upon the size, width and shape of the handle and the receptacle associated therewith. If a knob is used, one aperture will of course be sufficient whereas if a handle formed in the shape of a quarter of a sphere should be used, for example, three or more sets of fastening means might be required to give sufficient rigidity to the structure. While the remainder of the description will describe the fastening means in the singular, it will be understood that a plurality of fastening means will be used wherever necessary.

The leg portions 29 of the handle 12 are dimensioned to pass through the aperture 28 into the recess 21. As shown in Fig. 3, the portion 29 of the handle 12 is reduced in cross section as compared to the remainder of the handle thereby providing shoulders 30 which are adapted to bear against the front 11 adjacent the aperture 28. In order to limit any tendency of handle 12 to turn with respect to the spacer 21 and also to make the assembled structure as rigid as possible, the material on the upper and lower sides of the recess 21 is grooved as indicated at 36, the grooves 36 intersecting the slot 22. With this arrangement, the leg portion 29 is free to slide within the recess 21 sufficiently to permit the shoulders 30 to be drawn against the front 11.

In order to facilitate fastening of the various parts I have formed an opening or slot 31 in the leg portion 29 of the handle 12 in any suitable manner, as by stamping, the slot 31 being aligned with opening 23 in the spacer 20 and being dimensioned to receive a suitable securing member, as a screw 24, in an edgewise relationship after the screw is passed through an aperture 32 in the front wall 15 of the receptacle 10 and the opening 23 in the spacer 20. The slot 31 is made deep enough to permit sufficient axial movement of the screw 24 to insure adequate tightening of the fastening device.

In order to hold or lock the screw 24, I form a second slot 33 in the end portion 29 of the handle 12 in any suitable manner, the second slot being transverse to the slot 31 and intersecting the slot 31. If the slots 31 and 33 are formed by a stamping operation, the two slots may be formed in a single operation although the slots may be formed in any desired fashion. Slot 33 and the lateral opening or passage 34 in the spacer 20 are dimensioned to permit a suitable fastening or locking member, as a nut 35, to be slipped through the opening 34 into the slot 33. As best shown in Fig. 2, the slot 33 is large enough to permit a slight movement of nut 35.

In assembling the above-described parts, the leg portions 29 of the handle 12 are first inserted through the aperture 28 in the cover 11. The spacer 20 is then placed over the portion 29 which extends through the aperture 28 of the front 11 in such a way that the portion 29 fits into the grooves 36 and recess 21 in the spacer 20. Nut 35 is then inserted through the opening 34 into the slot 33 so that the threaded opening 37 of the nut 35 is aligned with slot 31 and the portion 23 of opening 22 in the spacer 20. It will be obvious that the screw 24 is next inserted through openings 32 and 23 and slot 31 for threaded engagement with nut 35. As screw 24 is tightened, shoulders 30 of the handle 12 will be drawn against the front 11 until the front 11 is clamped between the shoulders 30 and the spacer 20. At the same time the spacer 20 will be drawn against the front wall 15 of the receptacle 10.

In order to prevent rotation of the fastening means, I use a flat-sided nut 35 and provide the side of the recess 30 which is opposite the lateral opening 34 with a flat side, allowing merely enough space between the last-mentioned wall of the recess and the side of the nut to insure sufficient space to assemble the parts of the fastening device. If desired, a lock washer, not shown, could be used. If the portion 29 of handle 12 is thick enough, the flat sides of slot 33 will prevent any substantial turning of nut 35, irrespective of the contour of the walls of recess 21, assuming that the dimensions of slot 33 are only slightly larger than the dimensions of nut 35.

Various modifications of the above-described receptacle will occur to those skilled in the art. For example, the spacer 20 may be arranged in any desired shape. For example, the recess 21 may be omitted and the spacer 20 be used merely to space the facing plate 11 and the front wall 15 or the spacer may be provided merely with a shallow recess or a mere projection to support the nut 35 while the various parts are being assembled. It is also possible to omit the spacer altogether. With these modifications the front 11 and wall 15 of the receptacle may be arranged to permit the fingers or a suitable tool to be inserted between the front 11 and the front wall 15 for maneuvering the nut 35 during the tightening operation or, if desired, nut 35 could be held in place with heavy grease or wax so that special tools would not be required.

In the drawing, handle 12 is illustrated as being formed from relatively thin material as thin sheet aluminum for example. Such material is easily stamped and worked but whenever a relatively soft material is used, projections such as ears 29a formed during the slotting of portion 29 are valuable in securing the parts together. However, it is possible to discard the nut 35 and tap the slot 31 for threaded engagement with the bolt 24 particularly where a material suitable for threading is used. This modification is not my invention but is shown and claimed in a copending application of Richard H. Schmitt, Serial No. 208,386, filed May 17, 1938, and assigned to the same assignee as the present invention. It is also possible to use a molded handle having a locking member molded therein.

It will also be obvious that the handle may be omitted, if desired. In this case, the false front 11, as shown in Fig. 4, will be provided with a member 29b of suitable shape secured to the back of front 11 in any desired manner as by welding, the member 29b being arranged similarly to portion 29 of handle 12 for insertion into recess 21 of the spacer 20.

While I have shown and described my invention as applied to a receptacle adapted for use in a refrigerator, other modifications will readily be apparent to those skilled in the art. Thus the arrangement above set forth will find application wherever it is desired to affix one member or article to a base member or other supporting structure, particularly where a false or decorative front is used. I do not, therefore, desire my invention to be limited to the specific arrangement shown and described, and I intend in the appended claims to cover all modifications within the spirit and scope of my invention.

What I claim as new and desire to secure by Letters Patent of the United States is:

1. An arrangement for securing a facing plate to a supporting structure comprising a spacing element adapted to be interposed between said facing plate and said supporting structure, said element having a longitudinal passage extending therethrough and a lateral passage communicating between said longitudinal passage and a side of said element, said facing plate having a member associated therewith and adapted to extend into said longitudinal passage, said portion being provided with an opening, and fastening means associated with said supporting structure and said element, said means being adapted to extend through said longitudinal passage into said opening for engagement with said portion.

2. An arrangement for securing a facing plate to a supporting structure including a spacing element for maintaining said plate and said supporting structure in spaced relationship, said element having a recess extending inwardly from a side thereof and a longitudinal passage extending from said recess to another side of said element, said element also having a lateral passage communicating between said recess and a third side of said element, said facing plate having a member associated therewith and adapted to be inserted into said recess, said portion having an opening therein adapted to be aligned with said longitudinal and said lateral passages, and means comprising a locking member and a securing member for fastening said plate and said element and said supporting structure in assembled relationship, said locking member being adapted for insertion through said lateral passage into said opening and said securing member being associated with said structure and adapted for insertion through said longitudinal passage and said recess and said opening into engagement with said locking member.

3. In the combination of a receptacle and a facing plate therefor, said receptacle having an aperture in a wall thereof, a spacing element for maintaining said plate and said wall of said receptacle in spaced relationship, said element having a recess extending inwardly from the side of said element adjacent said facing plate and a longitudinal opening adapted to be aligned with said aperture in said wall of said receptacle and extending from said recess to the side of said element adjacent said wall of said receptacle, said element also being provided with a lateral opening extending between said recess and a third side of said element, said facing plate having an aperture therethrough, a handle having a portion thereof adapted to be inserted through said aperture into said recess, said portion of said handle having a first slot arranged to be aligned with said longitudinal opening after said handle is inserted in said recess and a second slot transverse to said first slot and intersecting said first slot, a locking member adapted to be inserted through said lateral opening in said element into said recess and said second slot after said handle is inserted through said aperture in said facing plate into said recess, and a securing member adapted to be inserted through said aperture in said wall of said receptacle and said longitudinal opening and said first slot into engagement with said locking member.

4. In the combination of a receptacle and a facing plate adapted to be secured to a wall thereof, a spacing element for maintaining said plate and said wall of said receptacle in spaced relationship, said wall being provided with an aperture therethrough, said element having a recess extending inwardly from the side of said element adjacent said facing plate and a longitudinal opening adapted to be aligned with said aperture in said wall and extending from said recess to the side of said element adjacent said wall of said receptacle, said element also being provided with a lateral opening extending between said recess and a third side of said element, said facing plate having an aperture therethrough, a handle having a portion thereof adapted to be inserted through said aperture into said recess, said portion of said handle having a first slot aligned with said longitudinal opening after said portion is inserted into said recess, said portion of said handle having a second slot transverse to said first slot and intersecting said first slot, a locking member adapted to be inserted through said lateral opening in said element into said recess and said second slot after said handle is inserted into said recess, a securing member adapted to be inserted through said aperture in said wall of said receptacle and said longitudinal opening and said first slot into engagement with said locking member, and means for preventing rotation of said locking member.

5. In the combination of a receptacle and a facing plate adapted to be secured to a wall of said receptacle, a spacing element for maintaining said facing plate and said front wall of said receptacle in spaced relationship, said wall of said receptacle having an aperture therethrough, said element having a recess extending inwardly from the side of said element adjacent said plate and a longitudinal opening adapted to be aligned with said aperture in said wall and extending from said recess to the side of said element adjacent said front wall of said receptacle, said element also being provided with a lateral opening extending between said recess and a third side of said element, said plate having an aperture therethrough, a handle having a portion thereof adapted to extend through said aperture into said recess, said portion of said handle having a first slot arranged for alignment with said longitudinal opening, said portion of said handle having a second slot transverse to said first slot and intersecting said first slot, a locking member adapted to be inserted through said lateral opening in said element into said recess and said second slot after said handle is inserted through said aperture in said plate into said recess, a securing member adapted to be inserted through said aperture in said front wall of said receptacle and said longitudinal opening and said first slot into engagement with said locking member, and means including a flat-sided portion on said locking member to prevent rotation thereof.

6. In the combination of a receptacle and a facing plate adapted to be secured to a wall of said receptacle, means including a spacing element for maintaining said plate and said wall of said receptacle in spaced relationship, a wall of said receptacle having an aperture therethrough, said element having a recess extending inwardly from the side of said spacer adjacent said plate and a longitudinal opening adapted to be aligned with said aperture in said front wall and extending from said recess to the opposite side of said element adjacent said front wall of said receptacle, said element also being provided with a lateral opening extending between said recess and a third side of said element, said plate having an aperture therethrough, a handle having a portion thereof arranged to be inserted through said aperture into said recess, said handle being provided with a shoulder adjacent said portion, said shoulder being adapted to engage said plate adjacent said aperture, said portion of said handle having a first slot aligned with said longitudinal opening after said portion is inserted into said recess, said portion of said handle having a second slot transverse to said first slot and intersecting said first slot, a locking member adapted to be inserted through said lateral opening in said element into said recess and said second slot after said handle is inserted through said aperture in said plate into said recess, a securing member adapted to be inserted through said aperture in said wall of said receptacle and said longitudinal opening and said first slot into engagement with said locking member, and means to prevent rotation of said locking member, said means including a flat-sided portion on said locking member.

GEORGE C. HARBISON.